B. J. Heywood.
Inkstand.
Nº 17,373. Patented May 26, 1857.
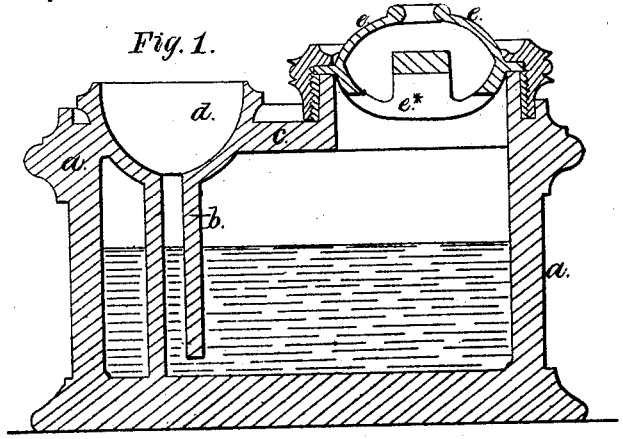
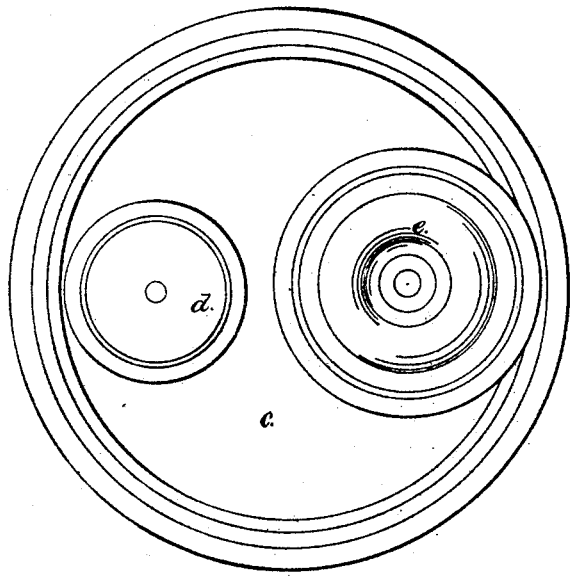
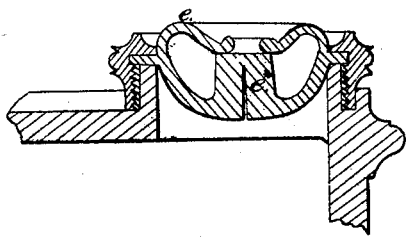

UNITED STATES PATENT OFFICE.

BENNETT JOHNS HEYWOOD, OF LONDON, ENGLAND.

INKSTAND.

Specification of Letters Patent No. 17,373, dated May 26, 1857.

*To all whom it may concern:*

Be it known that I, BENNETT JOHNS HEYWOOD, of Leicester Square, in the county of Middlesex, gentleman, a subject of the Queen of Great Britain, have invented Improvements in the Construction of Inkstands; and I do hereby declare that the following is a full and exact description of my said invention.

This invention relates to the application to inkstands of certain novel means for filling the dipping cup with ink, and withdrawing the ink therefrom when not required to be used. For this purpose I fit in one opening of the cover of an air tight inkstand a double or compound flexible valve of a peculiar construction composed by preference of two disks or dish shaped pieces of vulcanized india rubber cemented together at their upper edges. The upper disk or valve cover is pierced with a central hole to allow air to pass upward through it when air is required to be withdrawn from the inkstand and the lower disk is made self closing so as when pressed upon to serve as. an ingress or egress valve as required and when the pressure is removed to act as a cut off valve. By the action of this compound valve air is forced in or withdrawn from the inkstand and simultaneously the rise of the ink to or its descent from the dipping cup is effected.

In the accompanying drawings Figure 1 shows the improved inkstand in sectional elevation. Fig. 2 is a plan view of the same and Fig. 3 is a section of the compound valve taken at right angles to Fig. 1.

The peculiarity of this inkstand in contradistinction to others in which the pressure of air is employed to force ink into the dipping cup is the use of a self closing valve which opens when under pressure to permit the passage of compressed air into an air tight vessel containing the ink and closes when that pressure is withdrawn; the effect of the air so admitted into the vessel being to press upon the surface of the ink and thereby to cause it to escape at any given outlet.

$a$ $a$ represents an air tight vessel into which projects a tube $b$ connected to the underside of the cover $c$ of the inkstand and forming a continuation of a dipping cup $d$ which is to be kept supplied with ink through the tube $b$ so long as the inkstand is in use.

Fixed in the cover $c$ is the compound valve formed of two dish shaped disks of vulcanized india rubber $e$ $e^*$. These disks have a tendency to retain the position shown at Fig. 1. The upper disk $e$ it will be seen is pierced at its center and a raised lip is formed around the hole. On the upper face of the under disk $e^*$ a boss or projection is molded in order that when the upper valve is depressed it will come in contact therewith and force the lower valve into the position shown by dots in the detached view Fig. 3. A cross cutting is made in the lower disk valve $e^*$ in such manner that when depressed to the dotted position the cut will open and afford a passage for air into or out of the vessel $a$ as circumstances may require.

Now supposing that ink has been supplied to the ink vessel and that it is required to fill the dipping cup $d$ with ink the disk valve $e$ is pressed, down, the finger which imparts the pressure closing at the same time the central air passage formed therein. The air between the disks $e$ and $e^*$ will thus be compressed and finally forced through the opening in the lower valve into the ink vessel $a$. The pressure of air within the vessel $a$ being now superior to that of the atmosphere the ink will be impelled through a lateral hole in the tube $b$ upward into the dipping cup and the finger being now withdrawn from the upper valve $e$ that valve will rise to its former position. This action may be repeated as many times as is requisite to fill the dipping cup.

In order to withdraw the ink from the cup it is only necessary to press down the lower valve with the finger until it opens; leaving at the same time the air passage in the upper valve uncovered. The atmospheric pressure within and without the vessel $a$ will then become equalized and the ink in the cup will consequently return to the vessel $a$. By this means the evaporation and consequent thickening of the ink is obviated.

I claim—

The means herein set forth of forcing ink into the fountain of inkstands by the combined action of the lower valve and the aperture in the top plate or disk, which acts alternately as a closed and open valve by the application and removal of the finger.

In witness whereof I the said BENNETT JOHNS HEYWOOD have hereunto set my hand and seal the twenty-fourth day of December in the year of our Lord 1856.

BENNETT JOHNS HEYWOOD. [L. S.]

Witnesses:
 FRED WALKDEN,
 C. J. WINTERSGILL.